(12) United States Patent
Croak et al.

(10) Patent No.: US 7,760,861 B1
(45) Date of Patent: Jul. 20, 2010

(54) METHOD AND APPARATUS FOR MONITORING SERVICE USAGE IN A COMMUNICATIONS NETWORK

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1295 days.

(21) Appl. No.: 11/263,274

(22) Filed: Oct. 31, 2005

(51) Int. Cl.
*H04M 15/00* (2006.01)
*H04M 3/00* (2006.01)

(52) U.S. Cl. .............. 379/114.14; 379/127.02; 379/196

(58) Field of Classification Search ............ 379/112.01, 379/112.06, 114.14, 121.04, 127.02, 133, 379/134, 145, 188, 189, 197, 114.01, 191, 379/196; 455/410; 705/52, 75, 76
See application file for complete search history.

(56) References Cited

U.S. PATENT DOCUMENTS

| | | | | |
|---|---|---|---|---|
| 5,345,595 A | * | 9/1994 | Johnson et al. | 455/410 |
| 5,768,354 A | * | 6/1998 | Lange et al. | 379/189 |
| 6,163,604 A | * | 12/2000 | Baulier et al. | 379/189 |
| 6,535,728 B1 | * | 3/2003 | Perfit et al. | 455/410 |
| 6,567,511 B2 | * | 5/2003 | Betts et al. | 379/192 |
| 6,614,781 B1 | * | 9/2003 | Elliott et al. | 370/352 |

* cited by examiner

*Primary Examiner*—Quoc D Tran

(57) ABSTRACT

A method and apparatus for detecting abnormal calling activity in a communications network is described. In one embodiment, usage data associated with at least one phone number is obtained from the communications network. The usage data is subsequently processed to determine if abnormal calling activity associated with the at least one phone number is exhibited.

14 Claims, 4 Drawing Sheets

US 7,760,861 B1

METHOD AND APPARATUS FOR MONITORING SERVICE USAGE IN A COMMUNICATIONS NETWORK

BACKGROUND OF THE INVENTION

1. Field of the Invention

Embodiments of the present invention generally relate to telecommunications systems and, more particularly, to a method and apparatus for monitoring service usage in a communications network, such as a packet network, e.g., a voice over internet protocol (VoIP) network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VoIP) network.

Providers of VoIP network services, however, are at risk of losing a considerable amount of revenue due to fraudulent usage of provided voice services. In a VoIP network, theft of services can often go undetected until the monthly billing cycle occurs. Consequently, the significant costs incurred for the illegal use of these services typically goes unpaid.

Thus, there is a need in the art fro a method and apparatus for monitoring service usage in a communications networks.

SUMMARY OF THE INVENTION

In one embodiment, a method and apparatus for detecting abnormal calling activity in a communications network is described. More specifically, usage data associated with at least one phone number is obtained from the communications network. The usage data is subsequently processed to determine if abnormal calling activity associated with the at least one phone number is exhibited.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
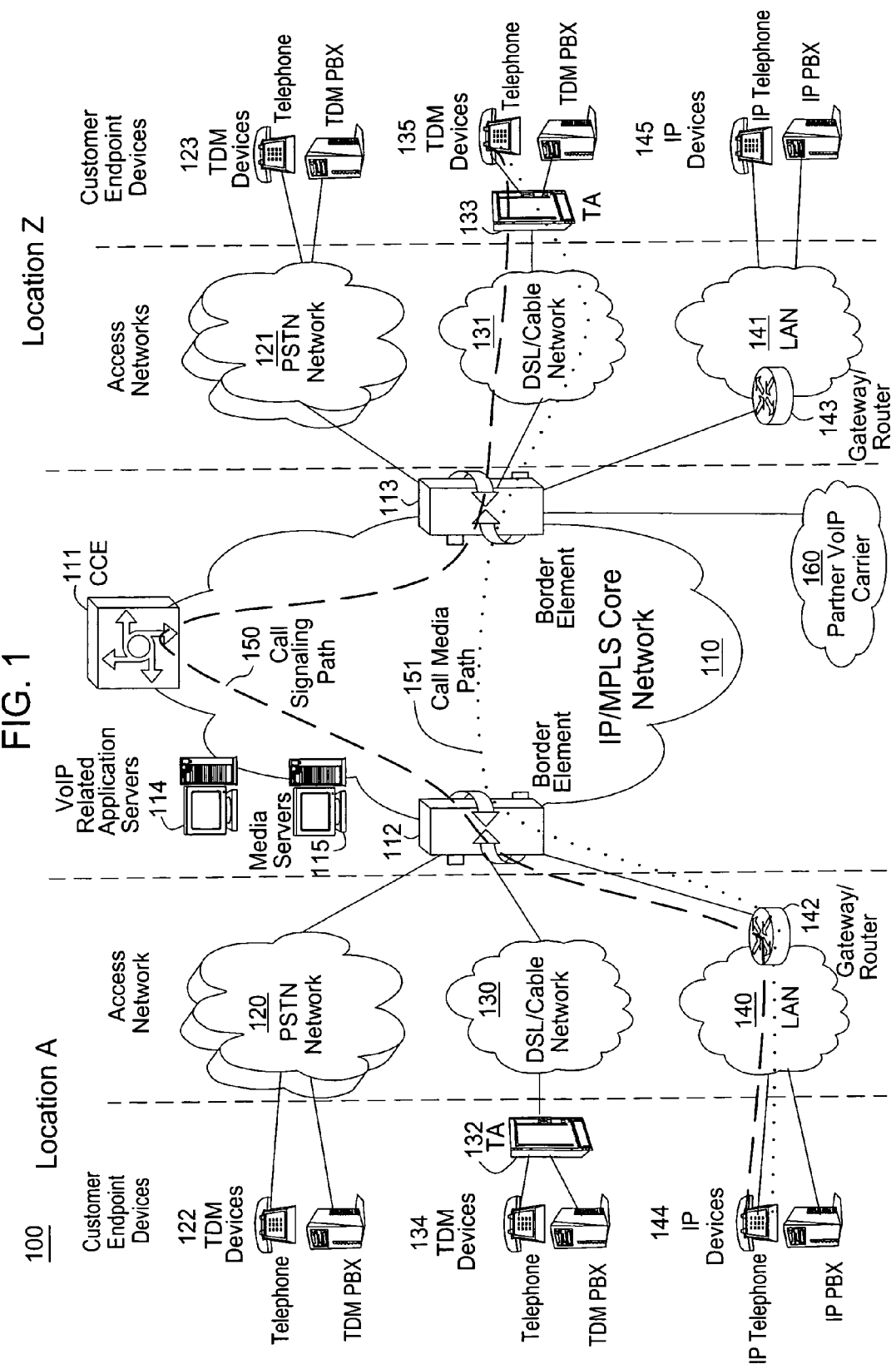
FIG. 1 is a block diagram depicting an exemplary embodiment of a communication system in accordance with the invention.

To better understand the present invention, FIG. 1 illustrates communication architecture 100 comprising an example network, e.g., a packet network such as a Voice over Internet Protocol (VoIP) network, related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Servers (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

One embodiment of the present invention provides a real time monitoring system that provides oversight of service usage on a per subscriber basis. Unusual activity or excessive usage triggers alarms to network operators who can then manually intervene on a real time basis to verify the legitimacy of the subscriber's behavior. The real time monitoring may be activated each time the subscriber places a call or may be invoked on a periodic basis.

Figure 2:
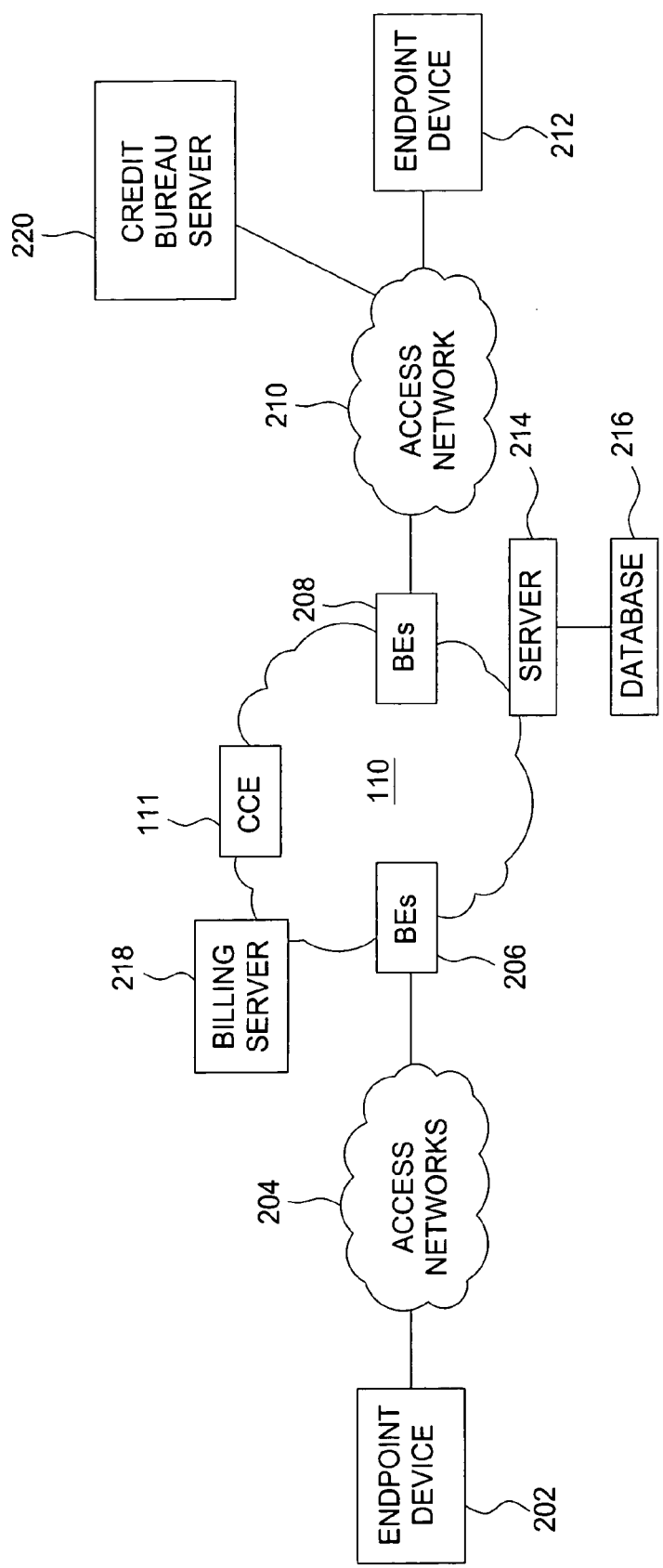
FIG. 2 is a block diagram depicting an exemplary configuration of the communication system of FIG. 1 constructed in accordance with one or more aspects of the invention.

FIG. 2 is a block diagram depicting an exemplary configuration of the communication system of FIG. 1 constructed in accordance with one or more aspects of the invention. An endpoint device 202 is configured for communication with the core network 110 via an access network 204 and one or more border elements (BEs) 206. An endpoint device 212 is configured for communication with the core network 110 via an access network 210 and one or more BEs 208. The endpoint device 202 and the endpoint device 212 may comprise any of the customer endpoint devices described above (e.g., TDM devices, IP devices, etc.). The access networks 204 and 210 may comprise any of the access networks detailed above (e.g., PSTN, DSL/Cable, LAN, etc.). The core network 110 further includes a web-based application server 214, which may comprise a dedicated application server that is configured to support web-based portals associated with various call services offered by the network service provider.

The core network 110 also includes a server 214 and a database 216. In one embodiment, the server 214 comprises a dedicated application server that is responsible for monitoring network service usage on a per subscriber basis. More specifically, the server 214 is configured to detect unusual calling activities (e.g., excessive usage) and to generate alarms to notify network operators. The database 216 may be any type of electronic collection of data that is well known in the art. In one embodiment, the database 216 may be configured to store calling histories (e.g., tendencies) and other customer data of every subscriber that may be utilized by the monitoring server 214. The server 214 also utilizes database 216 to store information, on a per subscriber basis, that pertains to potential fraud. This data may include the status of periodic checks on the subscriber's credit history, the excessive number of calls made to international destinations, unpaid monthly payments to network service bills, and the like. All of these forms of data serve as indicators to potential fraudulent activity or history.

In one embodiment of the present invention, the server 214 comprises a dedicated application server that is configured to collect network usage data, such as call detail records (CDRs), from the network elements in the core network 110 (e.g., the BEs 206, the BEs 208, the CCE 111). Notably, various network elements in the core network 110 continuously generate CDRs and other monitoring data for every call processed within the network. A CDR is data associated with a telephone call, including the originating telephone number, the dialed telephone number, the date and timestamp, the duration, the call setup delay, the final handling code of the telephone call, and like. The final handling code is the code that indicates whether a call has been completed successfully, blocked, cut-off, or the like. In one embodiment, a call processed by the core network 110 creates at least one CDR at each network element that is involved in the call (e.g., on a per call basis). As such, if multiple network elements are involved in the call, multiple CDRs are created for the call. A CDR created at BEs 206 and 208 for a particular call contains signaling and media information more related to the edge of the core network 110, whereas a CDR created by the CCE 111 for the same call contains signaling and media information more related to the core of the network 110. Alternatively, the server 214 may process data obtained from other network application servers, such as billing server 218 (which would collect call usage data, e.g., destination numbers and calling frequency by a subscriber).

The server 214 is configured to process CDRs (i.e., usage data) to provide fraud monitoring services for a VoIP service network. Specifically, the server 214 monitors a given subscriber's calling activities and usage to determine if anomalies or significant deviations from a subscriber's previous "calling history" occur. A calling history may be established by storing customer data obtained directly form the network (e.g., CDRs) or from other network component data stores (e.g., a database associated with a billing server that contains customer usage data). Thus, the server 214 is able to monitor for certain calling patterns (e.g., an excessive abnormal calls) that deviate from a subscriber's calling history. The server 214 may also monitor for certain destination numbers, such as phone numbers known to be associated with suspected fraudulent activity or "flagged" 1-900 numbers. Likewise, the monitoring server 214 may detect an excessive number of calls to a particular phone number. Alternatively, the server 214 may be configured to monitor for a high frequency of calls originating from a single customer account (to numerous destination numbers), in general. For instance, a customer may be subscribed to a fixed rate calling plan, which provides 1000 minutes per month. In the event the subscriber's account (via the billing server 218, for example) indicates usage in considerable excess of this amount (or alternatively, any other abnormal activity), the server 214 will generate an alarm. This threshold "excess" number may be any number that is predefined by the service provider. The alarm, which may be an audible alarm or visual alarm, then allows a network operator to intervene on a real time basis to verify the legitimacy of the subscriber's behavior, such as contacting the subscriber or suspending service to the account, if necessary.

The server 214 may be programmed by the service provider to perform monitoring activities in a variety of different ways. In one embodiment, the server 214 may be configured to be activated each time the subscriber places a call. Alternatively, the server may be activated to monitor the customer on a less frequent basis (e.g., every $5^{th}$ call request) if network resources are limited. In yet another embodiment, the monitoring server 214 may perform an inquiry on a periodic basis (e.g., daily, weekly, etc.). Since the monitoring functions may be configured on a per subscriber basis, the server 214 may be programmed to monitor a customer account that has been recently associated with fraudulent activity on a more frequent basis (e.g., a "flagged" customer account).

In the event any abnormal calling activity is detected, the server 214 may be configured to contact a server 220 that is associated with a credit bureau. The server 214 would then be able to obtain a given subscriber's credit history data or perform a credit check. Thus, the server 214 would be able to obtain information (e.g., credit history/check data) that may indicate whether the subscriber recently reported unauthorized use of credit, an identity theft, and the like. Consequently, this data may serve as an indication that the unauthorized use of telephony services has also transpired. The server 214 may then be programmed to transmit an alarm notification to a network operator or immediately suspend service.

Figure 3:
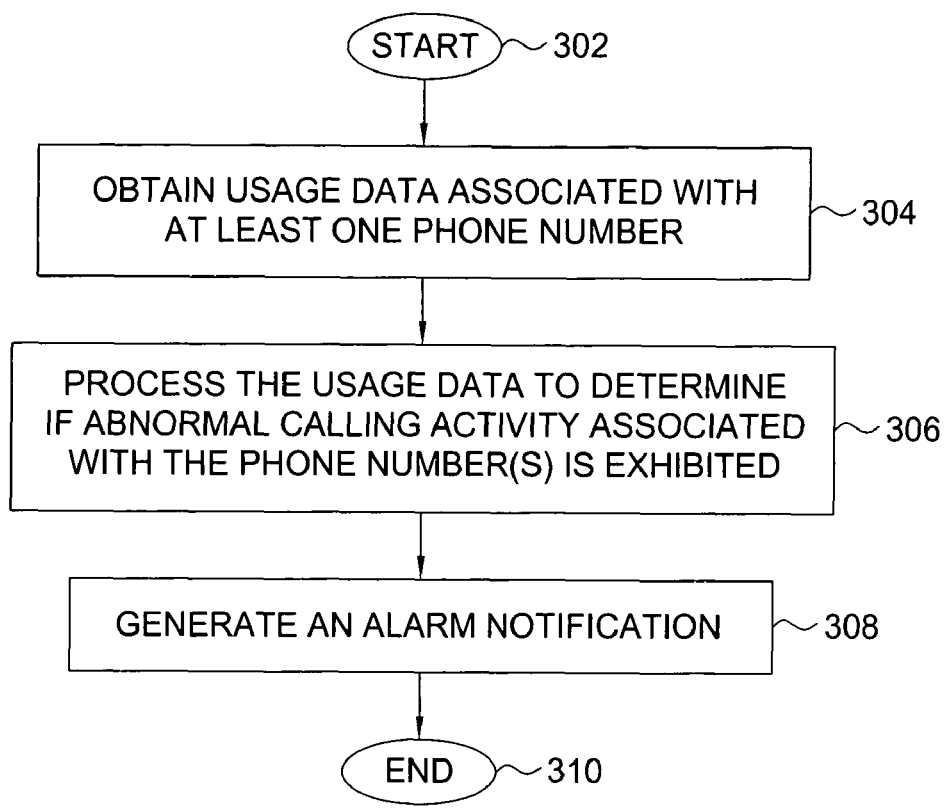
FIG. 3 is a flow diagram depicting an exemplary embodiment of a method for monitoring service usage in accordance with one or more aspects of the invention.

FIG. 3 is a flow diagram depicting an exemplary embodiment of a method 300 for detecting abnormal calling activity in a communications network as related to one or more aspects of the invention. The method 300 begins at step 302 and proceeds to step 304 where usage data associated with a phone number is obtained. In one embodiment, the server 214 obtains customer usage data, either directly from the network or from specialized dedicated servers (e.g., a billing server 218), that is related to at least one customer phone number.

At step 306, the usage data is processed to determine if abnormal calling activity associated with the phone number is exhibited. In one embodiment, the server 214 processes the acquired customer usage data in order to determine if potentially fraudulent behavior is taking (or has taken) place in regard to the use of a particular customer's phone number or account.

At step 308, an alarm notification is generated in response to the detection of abnormal activity. In one embodiment, a customer, a network administrator, or other entity is notified by a triggered alarm. Typically, a network operator is notified in a manner that will enable the operator to verify the legitimacy of the customer's calling behavior. The method 300 continues to step 310 and ends.

Figure 4:
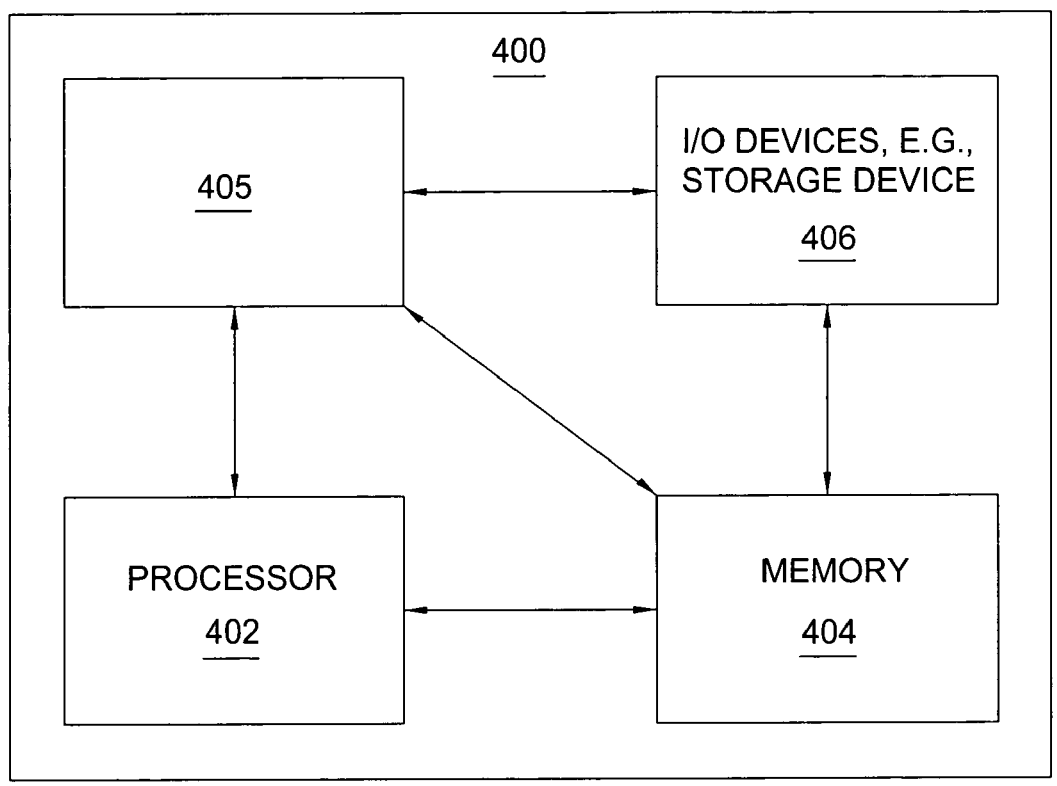
FIG. 4 is a block diagram depicting an exemplary embodiment of a computer suitable for implementing the processes and methods described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for monitoring service usage, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASICs), a general purpose computer or any other hardware equivalents. In one embodiment, the present module or process 405 for monitoring service usage can be loaded into memory 404 and executed by processor 402 to implement the functions as discussed above. As such, the present process 405 for monitoring service usage (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for detecting abnormal calling activity in a communications network, comprising:
   obtaining usage data associated with a phone number from said communications network;
   processing said usage data to determine if abnormal calling activity associated with said phone number is exhibited;
   contacting a credit bureau to acquire credit history data if said abnormal calling activity associated with said phone number is determined to be exhibited; and
   generating an alarm notification to indicate detection of said abnormal calling activity associated with said phone number if said credit history data indicates unauthorized activity.

2. The method of claim 1, wherein said communications network comprises an Internet Protocol (IP) network.

3. The method of claim 2, wherein the IP network comprises at least one of: a Voice over IP (VoIP) network or a Service over IP (SoIP) network.

4. The method of claim 1, wherein said obtaining step occurs on a periodic basis.

5. The method of claim 1, wherein said obtaining step further comprises:
   acquiring said customer data from a billing server residing in said communications network.

6. An apparatus for detecting abnormal calling activity in a communications network, comprising:
   means for obtaining usage data associated with a phone number from said communications network;
   means for processing said usage data to determine if abnormal calling activity associated with said phone number is exhibited;
   means for contacting a credit bureau to acquire credit history data if said abnormal calling activity associated with said phone number is determined to be exhibited; and
   means for generating an alarm notification to indicate detection of said abnormal calling activity associated with said phone number if said credit history data indicates unauthorized activity.

7. The apparatus of claim 6, wherein said communications network comprises an Internet Protocol (IP) network.

8. The apparatus of claim 7, wherein the IP network comprises at least one of: a Voice over IP (VoIP) network or a Service over IP (SoIP) network.

9. The apparatus of claim 6, wherein said means for obtaining further comprises:
   means for acquiring said customer data from a billing server residing in said communications network.

10. A computer-readable medium having stored thereon a plurality of instructions, the plurality of instructions including instructions which, when executed by a processor, cause the processor to perform the steps of a method for detecting abnormal calling activity in a communications network, comprising:
    obtaining usage data associated with a phone number from said communications network;
    processing said usage data to determine if abnormal calling activity associated with said phone number is exhibited;
    contacting a credit bureau to acquire credit history data if said abnormal calling activity associated with said phone number is determined to be exhibited; and
    generating an alarm notification to indicate detection of said abnormal calling activity associated with said phone number if said credit history data indicates unauthorized activity.

11. The computer readable medium of claim 10, wherein said communications network comprises an Internet Protocol (IP) network.

12. The computer readable medium of claim 11, wherein the IP network comprises at least one of: a Voice over IP (VoIP) network or a Service over IP (SoIP) network.

13. The computer readable medium of claim 10, wherein said obtaining step occurs on a periodic basis.

14. The computer readable medium of claim 10, wherein said obtaining step further comprises:
    acquiring said customer data from a billing server residing in said communications network.

* * * * *